3,651,015
PROCESS FOR PRODUCING POLYACETAL RESIN
Shinichi Ishida, Tokyo, Noboru Ohshima, Saitama-ken, Norimasa Fujita and Kyoichiro Mori, Yokohama, and Kunio Kurita, Tokyo, Japan, assignors to Asahi Kasei Kogyo Kabushiki Kaisha, Osaka, Japan
Filed Apr. 3, 1969, Ser. No. 813,016
Claims priority, application Japan, Mar. 5, 1969, 44/16,210
Int. Cl. C08g 1/02, 1/20, 3/00
U.S. Cl. 260—64
16 Claims

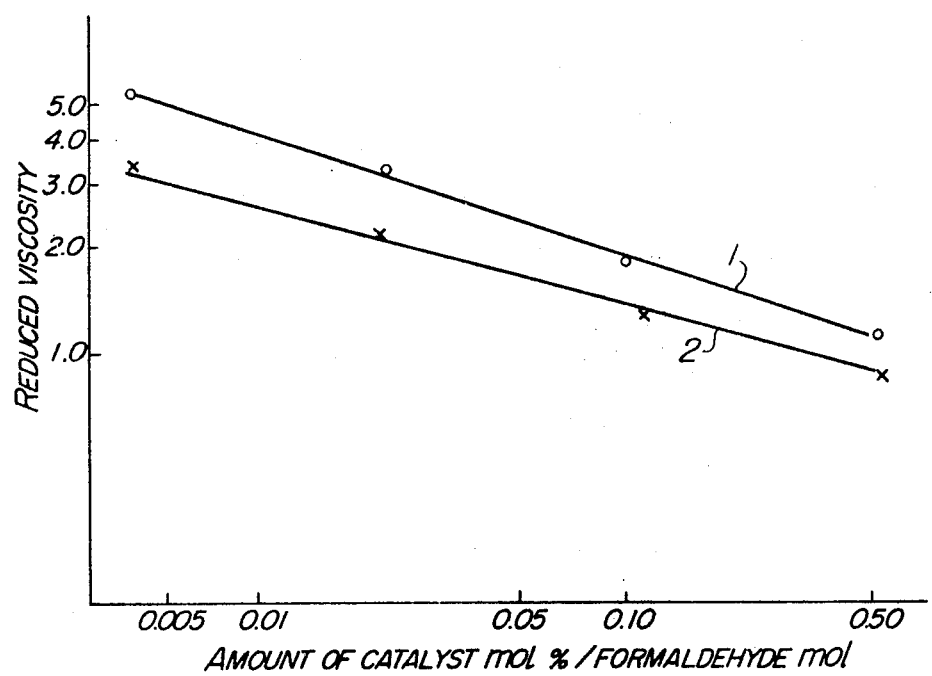

ABSTRACT OF THE DISCLOSURE

Polyacetal resin having good mechanical properties is prepared commercially advantageously by polymerizing formaldehyde containing up to 6% water or copolymerizing the formaldehyde with a monomer copolymerizable with formaldehyde using a tetravalent organo-tin compound represented by the following formula as a catalyst,

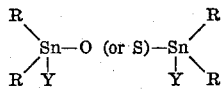

wherein R is a hydrocarbon radical, Y is halogen, hydroxy, thiocyano, alkoxy, thioalkoxy or alkoxycarbonyl group, and acylating the thus obtained polymer or copolymer.

---

This invention relates to a novel process for producing a moldable polyacetal resin, and more particularly a process for producing a homopolymer of formaldehyde or copolymer of formaldehyde and a monomer copolymerizable with formaldehyde using a novel catalyst.

The moldable polyacetal resin has been heretofore prepared by polymerizing formaldehyde using tertiary or quaternary amines, or metal salts of organic carboxylic acid, metal alcoholate, organo-metallic compound, or sulfonium salt or phosphonium salt as a polymerization catalyst thereby to prepare polyoxymethylene of a high molecular weight, and subjecting the thus obtained polyoxymethylene to chemical stabilization by esterifying or etherifying terminal hydroxy groups. In such prior processes, it is necessary that the polyoxymethylene has, as its properties, a high thermal stability and high toughness enough to give to the desired resin good mechanical strength such as a high resistance to bending, high breaking strength and high wear resistance. In order to prepare polyoxymethylene having such properties, it is necessary, though it may depend upon the kind of the polymerization catalyst used, that the sttrting material formaldehyde has a very high purity, for example, the allowable water content of formaldehyde must be repressed to less than 0.5% by weight, or preferably the formaldehyde must be substantially free of water or must have a water content of less than 0.05% by weight. In fact, it is very difficult to prepare substantialy anhydrous formaldehyde and this fact has greatly repressed the commercial development of the polyacetal resin.

In order to solve such problems, various studies and research have been heretofore made, and it is a well-known fact that the allowable water content of the starting material formaldehyde can be considerably increased by using some kind of divalent organotin compounds (Japanese patent publications Nos. 20,990/63, 3,933/64, 12,189/65, 12,188/65, 12,187/65, 16,798/65 and 22,394/65). However, these prior publications mention that a tetravalent tin compound impedes the polymerization.

The present inventors have found unexpectedly that some tetravalent tin compound has a catalytic activity of polymerizing impure formaldehyde singly or copolymerizing the impure formaldehyde with a monomer copolymerizable with the formaldehyde and a stabilized resin having good properties can be prepared from the intermediate polyoxymethylene thus prepared by using such catalyst, even if the properties of the polyoxymethylene are not enough, in the sense of the prior knowledge, to impart said mechanical properties to the desired stabilized resin, and this is a surprising fact in overthrowing said prior knowledge and the prevailing technical concept. In addition, the tetravalent tin compound catalyst used in the present invention is applicable to a wider range of polymerization temperature than the conventional catalyst, and further the present catalyst can readily control the molecular weight of the polyoxymethylene formed in the polymerization and can much increase the bulk density of the polyoxymethylene. The present catalyst can be easily removed from the formed intermediate polyoxymethylene or terminated polyoxymethylene. The present catalyst itself can be readily prepared from a divalent tin compound and is more stable. The present invention has many advantages as mentioned above and thus has a high commercial value. Further, the polyoxymethylene obtained in accordance with the present invention exhibits sharp molecular weight distribution and, therefore, is suitable for practical use.

An object of the present invention is to provide a process for producing a moldable polyacetal resin commercially advantageously using a novel catalyst.

The polymerization catalyst used in the present invention is a tetravalent organo-tin compound represented by the following formula:

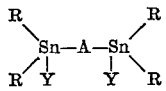

wherein R's are the same or different members selected from the group consisting of alkyl of 1 to 20 carbon atoms, cycloalkyl, aryl, aralkyl and alkenyl, and substituted with halogen, nitrile, hydroxy, alkoxy or alkoxycarbonyl groups; A is oxygen or sulfur; and Y's are the same or different members selected from the group consisting of hydroxy group, thiocyano group, halogen, and

—OCOR'

—OR', and —SR' groups, where R' has the same definition as said R.

The tetravalent organo-tin compound defined by the foregoing formula includes the following compounds:

Tetramethyl-1,3-diacetoxydistannoxane,
Tetra-n-butyl-1,3-diacetoxydistannoxane,
Tetra-n-hexyl-1,3-diacetoxydistannoxane,
Tetramethyl-1,3-dipropionyloxydistannoxane,
Tetra-n-butyl-1,3-dibutyroyloxydistannoxane,
Tetra-n-butyl-1,3-dibutyryloxydistannoxane,
Tetramethyl-1,3-dilauroyloxydistannoxane,
Tetraethyl-1,3-dilauroyloxydistannoxane,
Tetramethyl-1,3-distearyloxydistannoxane,
Tetra-n-octyl-1,3-distearyloxydistannoxane,
Tetraphenyl-1,3-didecanoyloxydistannoxane,
Tetrabenzyl-1,3-dilauroxydistannoxane,
Tetramethyl-1,3-dibenzoyloxydistannoxane,
Tetra-p-ethylphenyl-1,3-dibenzoyloxydistannoxane,
Tetra-dodecyl-1,3,-diacetoxydistannoxane,
Tetra-methyl-1,3-decanoyloxydistannoxane,
Tetra-pentadecyl-1,3-dilauroxydistannoxane,
Tetra-methyl-1-acetoxy-3-propionyloxydistannoxane,
Tetra-n-butyl-1-acetoxy-3-butyryloxydistannoxane,
Tetra-n-butyl-1-lauroxy-3-octanoyloxy-distannoxane,
1,1-dimethyl-3,3-di-n-butyl-acetoxy-3-butyroloxy-distannoxane,
1,3-di-(methylethyl)-1,3-diacetoxydistannoxane, 1,1-diphenyl-3,3-dimethyl-1,3-dipropionyloxydistannoxane,
Tetra2-cyanoethyl)-1,3-diacetoxydistannoxane,
Tetra(4-cyanobutyl)-1,3-dilauroyloxydistannoxane,
Tetra-(2-hydroxyethyl)-1,3-dibutyryloxydistannoxane,
Tetra-(p-methoxyphenyl)-1,3-dipropionyldistannoxane,
Tetra-(2-ethoxyethyl)-1,3-dibenzoyloxydistannoxane,
Tetra-(1-chloroethyl)-1,3-diformyloxydistannoxane,
Tetra-(3-methoxycarbonylpropyl)-1,3-diacetoxydistannoxane,
Tetramethyl-1,3-dimethoxydistannoxane,
Tetra-n-butyl-1,3-diethoxydistannoxane,
Tetra-n-octyl-1,3-dibutoxydistannoxane,
Tetra-dodecyl-1,3-dipropoxydistannoxane,
Tetra-(2-methoxyethyl)-1,3-dioctyloxydistannoxane,
Tetra-(2-cyanoethyl)-1,3-dibutoxydistannoxane,
Tetramethyl-1,3-diphenoxydistannoxane,
Tetraallyl-1,3-dimethoxydistannoxane,
Tetraethyl-1,3-di-(2-hydroxyethoxy)distannoxane,
Tetra-n-butyl-1,3-di-(3-cyanopropyl)distannoxane,
Tetra-n-butyl-1,3-di-(2-octylthioethoxy)distannoxane,
1,1-dibutyl-3,3-dimethyldibutoxydistannoxane,
Tetramethyl-1-butoxy-3-propoxydistannoxane,
Tetramethyl-1,3-diethylmercaptodistannoxane,
Tetramethyl-1,3-di(2-chloroethylmercapto)distannoxane,
Tetrabutyl-1,3-dibenzylmercapto-didistannoxane,
Tetraoctyl-1,3-didecylmercaptodistannoxane,
Tetraethyl-1-hydroxy-3,3-phenoxydistannoxane,
Tetra-n-butyl-1-hydroxy-3-acetoxydistannoxane,
Tetraoctyl-1-hydroxy-3-isopropoxydistannoxane,
Tetramethyl-1-acetoxy-3-n-butoxydistannoxane,
Tetrabenzyl-1-hydroxy-3-(2-methoxyethoxy)distannoxane,
Tetramethyl-1,3-dichlorodistannoxane,
Tetraethyl-1,3-dibromodistannoxane,
Tetraoctyl-1,3-dichlorodistannoxane,
Tetramethyl-1,3-difluorodistannoxane,
Tetra-n-butyl-1,3-diiododistannoxane,
Tetramethyl-1-chloro-3-acetoxydistannoxane,
Tetraphenyl-1-bromo-3-butoxydistannoxane,
Tetra-(2-butoxyethyl)-1,3-dichlorodistannoxane,
Tetramethyldistannoxane-1,3-di-(2-hydroxylaurate),
Tetramethyldistannoxane-1,3-di-(monomethylmaleate),
Tetrabutyldistannoxane-1,3-di-(monohydroxyethylmaleate),
Tetrabutyldistannoxane-1,3-dicinnamate,
Tetra-n-octyldistannoxane-1,3-disalicylate,
Tetracyclohexyldistannoxane-1,3-di(2-hydroxyethylthioglycolate),
Bis-(dimethylacetoxy-tin)sulfide,
Bis-dimethylbutyryloxy-tin)sulfide,
Bis-dimethylmethoxy-tin)sulfide,
Bis-(dibutyllauroyloxy-tin)sulfide,
Bis-(di-n-pentylacetoxy-tin)sulfide,
Tetramethyl-1,3-dithiocyanodistannoxane,
Tetrabutyl-1,3-dithiocyanodistannoxane,
Tetraethyl-1-hydroxy-3-thiocyanodistannoxane,
Tetraoctyl-1-chloro-3-thiocyanodistannoxane, and
Tetraphenyl-1-acetoxy-3-thiocyanodistannoxane.

These tetravalent organo-tin compounds can be readily obtained in high yield according to well known methods [J. Am. Chem. Soc., 82, 3285 (1960), Japanese patent publication No. 10,888/65, J. Org., 1, 81 1963), Japanese patent publication No. 2,327/68, etc.], and are generally cheap polymerization catalysts.

These tetravalent organo-tin compounds have more or less different structures from one another, but all of these compounds have an activity as a catalyst for polymerizing formaldehyde, and have many advantages, as will be explined below. Above all, the organo-tin compounds, whose R's are groups having 1 to 3 carbon atoms, are particularly preferable from such a viewpoint as simple removal thereof from the polymer, as described below, among those compounds as represented by said formula. For example, the following compounds can be mentioned as being particularly preferable:

Tetramethyl-1,3-diacetoxydistannoxane,
Tetramethyl-1,3-dipropionyldistannoxane,
Tetraethyl-1,3-diacetoxydistannoxane,
Tetraisopropyl-1,3-dibutyryloxydistannoxane,
Tetramethyl-1,3-dilauroyldistannoxane,
Tetramethyl-1,3-dichlorodistannoxane,
Tetraethyl-1,3-dithiocyanodistannoxane, and
Bis-(dimethylacetoxy-tin)sulfide.

The advantage of the tetravalent organo-tin compounds of the present inveniton will be hereunder explained in detail from a commercial viewpoint:

The present catalyst is very insensitive to impurities present in the polymerization system, and thus in carrying out the polymerization, it is not always necessary to use substantially anhydrous formaldehyde as a starting material. That is, a sufficiently commercially valuable, high molecular weight polyoxymethylene can be prepared not only from substantially anhydrous formadehyde having a water content of less than 0.05% by weight, but also from formaldehyde having a water content of 0.5 to 5% by weight that cannot be usually deemed "substantially anhydrous." This feature can be commercially highly evaluated, because a purification step of starting material formaldehyde has been regarded as the most important and most difficult one in a process for producing a polyacetal resin by polymerizing formaldehyde, and any commercially satisfactory method for attaining the purification has not been found yet till now. Thus, the present catalyst plays a very important role in the process for producing the polyacetal resin.

The reduced viscosities of the polymers obtained by polymerizing formaldehyde using the well-known catalyst, that is, tertiary amine catalyst (tributylamine) under the same conditions and those of the polymers obtained by polymerizing formaldehyde having the same purity using the present catalyst are given in Table 1. The reduced viscosities were measured in a solution mixture of p-chlorophenol and tetrachlorethane having a mixing ratio of 1:1 by volume at 60° C.

TABLE 1

| | Tetramethyl-1,3-diacetoxy-distannoxane | Tributylamine |
|---|---|---|
| Water content of formaldehyde (percent by weight): | | |
| 0.01 | 5.05 | 3.41 |
| 0.45 | 4.23 | 1.56 |
| 1.03 | 2.95 | 0.63 |
| 3.25 | 1.78 | 0.04 |

Accordingly, when the polymerization is carried out according to the present invention the starting material formaldehyde can be directly used in the polymerization without any purification of the formaldehyde, for example, without purifying the formaldehyde obtained by the conventional method for producing the starting material formaldehyde, for example, the decomposition of such low molecular weight polymer as paraformaldehyde, α-polyoxymethylene, ε-polyoxymethylene, hemiformal, trioxane, etc., by means of the conventional purification method, for example, cold trap or scrubbing method.

The present catalyst can be applied to polymerization at a wider temperature range, and the feature of the present catalyst can be attained even in a polymerization at an elevated temperature at which it has been heretofore regarded as being generally impossible for carrying out the polymerization.

It is well known from examples in the literature and patent specifications that a temperature below 30° C. is generally suitable for obtaining a commercially valuable high viscosity polyoxymethylene when formaldehyde is polymerized by means of amines or organometallic compounds generally employed as the well known polymerization catalyst. Accordingly, in carrying out the polymerization in a commercial scale by means of such well known polymerization catalyst, it is necessary to remove a large amount of heat evolved during the polymerization in order to maintain the polymerization temperature at such a low temperature as 30° C. Thus, a cooling surface area of the polymerization reactor must be increased or a refrigerating machine must be used for said purpose, and consequently the polymerization apparatus becomes complicated or operating labor is inevitably increased. These are the disadvantages encountered when the conventional catalyst is used in a commercial scale polymerization of formaldehyde.

On the other hand, when the present catalyst is used, the polymerization can be carried out not only at a low temperature of less than 30° C., but also at an elevated temperature, for example, 60° to 70° C. Even at such an elevated temperature, a sufficiently commercially valuable, high molecular weight polymer or copolymer can be prepared. Thus, the present catalyst has a very high commercial advantage. For example, even if water at ordinary temperature is used as a cooling medium to remove the evolved heat from the polymerization reactor, a large temperature difference can be allowed between the cooling water temperature and the polymerization temperature, and thus a large amount of heat evolved during the polymerization can be readily removed. Thus, the polymerization temperature can be readily controlled to the desired specific one.

As explained in detail in examples of the present invention, this fact can be sustained by comparing the reduced viscosity of the polymer obtained by the polymerization using the present catalyst at varied polymerization temperatures with that of the polymer obtained by the polymerization using the well known catalyst, for example, a tertiary amine, under the same conditions. The result is shown in Table 2.

TABLE 2

| | Tetramethyl-1,3-dilauroyl-oxydistannoxane | Tributylamine |
|---|---|---|
| Polymerization temperature, ° C.: | | |
| 30 | 3.41 | 2.18 |
| 40 | 3.03 | 1.23 |
| 50 | 2.98 | 0.89 |
| 60 | 2.73 | 0.30 |
| 70 | 2.01 | 0.08 |
| 80 | 1.37 | 0.04 |

Accordingly, when the polymerization is carried out on a commercial scale using the present catalyst, it is possible to conduct the polylmerization at an elevated temperature which has been heretofore regarded as being impossible, and the present catalyst is commercially advantageous also in this respect.

A further advantage of the present catalyst is that the molecular weight of polyoxymethylene can be readily controlled by changing the amount of catalyst to be used.

In order to control the molecular weight of polyoxymethylene in polymerizing formaldehyde according to the prior art, it is well known to utilize the existing impurities in the system in case that the polymerization catalyst is an amine or ammonium compound (British Pat. No. 796,862 and U.S. Pat. No. 3,017,389) or to conduct an air or oxygen contact when the end-capping by acetylation is carried out with acetic anhydride (Japanese patent publication No. 11,510/65). These well known controlling methods are based on a control of a very small amount of impurities in the polymerization system or terminal stabilization system, and it has been very difficult to conduct such methods on a commercial scale.

On the other hand, the molecular weight of the polymer can be controlled in the present invention only by changing the proportion of catalyst to the starting material formaldehyde, when the present catalyst is used in the polymerization. That is to say, when the polymerization is conducted under the same conditions as in the prior art method, the molecular weight of polyoxymethylene can be determined in the present invention only by the amount of the catalyst used. In general, this relation can be represented by the following formula:

$$\log [\text{mean molecular weight}] = \alpha \log [C] + \beta$$

wherein [C] is a mole number of the catalyst used on the basis of one mole of formaldehyde, and $\alpha$ and $\beta$ are constants depending upon the kind of catalyst and polymerization conditions. That is, if the polymerization conditions are given, a polymer having a desired molecular weight can be reproducibly obtained by changing the amount of the catalyst under said given polymerization conditions.

A still further advantage of the present catalyst is that the polymer obtained by using the present catalyst has a very high bulk density and is of a granular shape. When the polymerization is conducted using the well known catalyst, for example, tertiary amines or metal salts of organic carboxylic acids, linear or powdery polymer having a low bulk density is obtained.

The process for polymerizing formaldehyde can be usually classified as a liquid phase suspension polymerization or a gaseous phase polymerization, and usually the liquid phase suspension polymerization process is widely employed. In the suspension polymerization process, the bulk density of the formed polymer and the shape of the granules have a very great significance. That is, if a polymer having a high bulk density can be prepared, it is possible to increase the concentration of polymer slurry in the polymerization reactor, and thus the amount of a solvent can be reduced. In other words, a small polymerization reactor can be employed, and the process thus becomes economical. Further, the size of polymer granules is related to the filtration ratio, filtration loss, and further the end-capping, washing and molding. Polymer granules having large sizes are very advantageous in a commercial scale polymerization.

Granular polymer can be obtained by using the present catalyst, and it is possible to obtain granular polymers having an average size of 100μ or over. For example, Table 3 shows the bulk densities of the polymers obtained by polymerization using the well known catalyst, that is, tertiary amine and metal salt of organic carboxylic acid, and the present catalyst respectively under the same conditions:

TABLE 3

| Polymerization catalyst | Bulk density* of polymer | Shape of polymer |
|---|---|---|
| Tetramethyl-1,3-diacetoxydistannoxane | 0.51 | Granular. |
| Tetrabutyl-1,3-dilauroyloxydistannoxane | 0.45 | Do. |
| Tributylamine | 0.09 | Flocky. |
| Calcium stearate | 0.13 | Granular. |

*The bulk density was determined according to JIS-K-6911.

A still further remarkable advantage of the present catalyst is that in the polymer obtained by using the present catalyst, the catalyst residue can be readily removed, as compared with the polymer obtained by using the metal compound as a catalyst, and thus no coloring is brought about and a polyacetal resin having a good thermal stability can be obtained in the present invention.

As is well known in the prior art, the polyoxymethylene itself has a very poor thermal stability after the polymerization, even if the polyoxymethylene has a higher molecular weight, and thus is less applicable as it is. As a result, it is a usual practice to stabilize it by chemical treatment of the terminal groups, such as by esterification or etherification. It is well known that, particularly in the case that an organometallic compound is used as a polymerization catalyst, the thermal stability of the thus obtained polymer is considerably deteriorated, if the catalyst remains in the polymer after such stabilization treatment, and still worse the coloring is brought about. Accordingly, it is necessary to completely remove the catalyst residue from the polymer by washing during or after the stabilization treatment.

It is necessary to subject the polymer obtained by using the present catalyst to the stabilization treatment such as acylation, and the present catalyst remains in the polymerization system even after the polymerization reaction. That is, the present catalyst is mixed in or chemically combined with the formed high molecular weight polyoxymethylene. This phenomenon can be observed in the cases where the divalent organo-tin compounds (Japanese patent publication Nos. 12,187/65, 1,288/65, etc.) or other organo-metallic compounds are used as the catalyst, but these prior art catalysts are hardly dissolved before the acylation and thus it is indispensable in the prior art process to conduct such complicated post-treatment as complete extraction or washing with an organic solvent such as acetone or methanol after, the completion of the stabilization, and successive repeated water washing.

On the other hand, the present catalyst can be very well dissolved in the solvent before the acylation and further the catalyst chemically combined with the polyoxymethylene can be readily released from the polyoxymethylene by the acylation treatment and dissolved in an acylating agent. Furthermore, a compound having a specific structure, among the present catalysts, for example, the compound each of whose two alkyl groups combined with tin has three or less carbon atoms, is water-soluble by itself or is made water-soluble by the acylating agent, when the compound itself is not water-soluble, through the conversion of $-OR'$, $-OCOR'$, or $-C-R'$ to $-OCOCH_3$, where $R'$ has the same definition as made above. Thus, even if a very small amount of the catalyst residue remains in the polymer after the acylation treatment, it is not necessary to conduct washing with such an organic solvent as acetone or methanol of the prior art process. That is, the catalyst residues can be completely removed only by water washing in the present invention.

As stated above, the catalyst residue can be removed in the present invention in a manner as readily as in the case where such an organic compound as amines is used as catalyst, or much more readily than in the case where other organometallic compounds are used as the catalyst. In this way, a good polyacetal resin excellent in thermal stability and in whiteness can be prepared in the present invention.

The present catalyst has various advantages as never seen in the well known catalyst, as a catalyst for polymerizing formaldehyde on a commercial scale, as stated above. The present catalyst has still further advantages owing to the properties of the compound itself. That is to say, the present tetravalent organo-tin compound used in the present invention is more stable than the divalent compound and has no tendency to decrease its activity during the polymerization reaction. Further, the present tetravalent organo-tin compound is more soluble in an organic solvent, for example, toluene and hexane, than the divalent organo-tin compound, and thus the present catalyst can be readily prepared. Further, the trialkyl tin compound is very toxic in general, whereas all of the present catalysts are derivatives of dialkyl tin, and thus are less toxic. Further, the present catalysts are all non-volatile, and thus can be readily handled.

The embodiments of carrying out the present invention are hereunder explained:

The amount of the catalyst used in carrying out the present invention can be widely changed as explained above, but is generally 0.0001 to 2% by mole, preferably 0.001 to 0.5% by mole on the basis of the starting material formaldehyde.

Various procedures can be used in preparing a reaction system. That is, the following methods can be used: A method for adding to formaldehyde dissolved in an inert solvent a predetermined amount of the catalyst in an inert solvent at once; a method for gradually adding a formaldehyde solution to a catalyst solution; a method for continuously mixing a catalyst solution with a formaldehyde solution and continuously withdrawing the thus obtained polymer or slurry; and a method for continuously supplying gaseous formaldehyde to a catalyst solution, while continuously withdrawing the thus obtained polymer or slurry from the other end.

Further, it is possible to carry out the polymerization under pressure or reduced pressure, if necessary, in the present invention.

The present invention can be carried out at a wide range of polymerization temperature. Generally, the polymerization can be carried out at $-80°$ to $+130°$ C., preferably $-40°$ to $+80°$ C. However, in view of the feature of the present catalyst, it is commercially advantageous to carry out the polymerization at $+20°$ to $+70°$ C.

When the present invention is carried out in an inert solvent, the solvent applicable to the present invention must be inert to the polymerization and includes such aromatic hydrocarbons as benzene, toluene and xylene; such aliphatic and alicyclic hydrocarbons as hexane, pentane, octane, cyclohexane, and cyclopentane; halogen substitutes of these compounds, for example, chlorobenzene, tetrachloroethane, and chloroform; ethers such as ethylether, and propylether; esters such as ethyl acetate, butyl acetate and methylene diacetate; nitriles such as acetonitrile and propionitrile; carboxylic acid anhydride such as anhydrous acetic anhydride and butyric anhydride. These solvents are used singly or in a mixture of at least two of these solvents. It is preferable in view of the low cost as well as simplicity of purification to use such aliphatic and alicyclic hydrocarbons as hexane, pentane, octane, cyclohexane and cyclopentane, and such aromatic hydrocarbons as benzene, toluene and xylene.

The amount of the solvent can be varied in a wide range, but it is possible to use 0.3 to 30 parts by weight of the solvent per one part by weight of formaldehyde.

The present polymerization process can very highly ensure a reproducibility of the desired degree of polymerization by using the present catalyst, and is rarely influenced with a change in purity of formaldehyde or change in concentration. Thus, a homogeneous polymer can be obtained.

In carrying out the polymerization using the present catalyst according to any one of the polymerization processes as stated above, it is possible to produce a copolymer. The comonomer copolymerizable with formaldehyde includes, for example, acrylamide, other unsaturated carboxylic acid amides, such aliphatic aldehydes as acetaldehyde, butyraldehyde and chloral, and such ketenes as ketene and dimethylketene.

The polyoxymethylene obtained in the manner as described above exhibits very poor thermal stability and has no moldability and toughness in spite of its high molecular weight, and thus could be quite disregarded from the conventional standpoint of the high molecular weight polyoxymethylene for molding purpose.

Though the polymer obtained according to the present invention and which has not been subjected to end-capping exhibits inferior thermal stability, it can be subjected to etherification or esterification treatment in a conventional manner to produce finally polyacetal resin which is characterized by its superior thermal stability, an unexpectedly great difference in thermal stability being observed between the treated resin and untreated polymer. Further, the yield at the end-capping stage is as high as that in the case of the conventional, good, high molecular weight polyoxymethylene, and the thermal stability, moldability or toughness of the thus obtained resin is as high as that of the prior art resin.

Several other methods than the methods based on the esterification or etherification are known for the terminal stabilization of the high molecular weight polyoxymethylene, but an acylation method using an acid anhydride is widely used from the standpoint of stabilization effect and economics. Thus, explanation is made hereunder on the acylation of the polyoxymethylene polymer obtained by using the present catalyst.

That is to say, 20 to 200% by weight of acid anhydride on the basis of the polyoxymethylene polymer is added to a polymer slurry or dried powder and the terminal acylation treatment is effected at a temperature of 130° to 180° C. in the presence of an acylating catalyst. More particularly, the terminal acylation treatment is effected at a temperature of 130° to 180° C., preferably at a temperature of 140° to 160° C. in an open system or closed system by adding acetic anhydride or other well known acylating agent and the corresponding acylating catalyst to the polymer slurry or dried powders.

As the acylating catalyst, well known tertiary amine, such alkali metal carboxylate as sodium acetate, alkali metal alcoholate, or phenolate or others can be employed.

In addition to said liquid phase acylating method, a gaseous phase method based on a contact of acid anhydride vapors with the granular polymer in the presence of an acylating catalyst at 130° to 180° C., preferably 140° to 165° C., can be carried out.

When the terminal stabilization treatment is carried out according to the liquid phase method, an acylating agent or etherifying agent is used in an amount 10 to 20 times by weight as much as polyoxymethylene. Though theoretically the reaction takes place only at such tiny parts as terminals of the polymer, that is, polyoxymethylene, such a large amount of acylating agent or the like must be used in the prior art method, because the polymer is very bulky, for example, the bulk density ranges in about 0.05 to 0.2. Thus, when the acylating agent or etherifying agent is not used in an amount ten times as much or more, it is difficult even to make uniformly wet the polymer to be treated. This is the main reason for using such a large amount of acylating agent in the prior art method.

On the other hand, the polymer prepared by using the present catalyst has a very high bulk density, as described above, and thus a polymer having a sufficiently satisfactory thermal stability can be obtained by using a very small amount of an acylating agent such as 20 to 200%, particularly 100% or less on the basis of the polymer. Thus, the present invention is very economical.

Further, the present catalyst is very soluble in the acylating agent, and thus the major portion of the polymerization catalyst residue in the polymer can be removed from the polymer only by filtering the acylating agent off the polymer. Furthermore, even if a very small amount of the catalyst residue is attached to the polymer, the polymerization catalyst residue after the acylation becomes water-soluble when the present polymerization catalyst is used, and thus the polymerization catalyst residue can be readily removed only by water washing. Further, the polymer prepared according to the present invention has a high bulk density and is of a granular shape, a very small amount of water is used only for water washing, and even the number of water washings can be considerably reduced. Even in the filtering operation in the water washing step, the rate of filtration is very high and the solvent content of the polymer after the filtration is small. Further, the filtration loss is also very small. These numerous advantages can be attained in the present invention To the acylated polymer or acylated copolymer of the high molecular weight polyoxymethylene thus obtained are added a suitable antioxidant, light stabilizer or heat stabilizer, in well known manner, whereby a molding composition can be prepared.

The present invention is hereunder explained with reference to the following examples. The reduced viscosity of polyoxymethylene in the examples was measured at a polymer concentration of 0.5% by weight at 60° C., using a solution mixture of p-chlorophenol and tetrachloroethane at a mixing ratio of 1:1, which contained 0.5% by weight of α-pinene, unless otherwise specified. Further, the thermal stability of the acylated polymer is represented by thermal decomposition rate constant $K_{222}$ (percent per minute) at 222° C.

The accompanying drawing is a graph showing correlations between the amount of catalyst and reduced viscosity of the resin in Example 31 according to the present invention, where the result shown by the straight lines well satisfies the formula as described before.

EXAMPLE 1

In a 500 cc., four-necked separable flask provided with a stirrer and thermometer were added 300 cc. of n-hexane and 0.045 g. of tetramethyl-1,3-diacetoxystannoxane as a catalyst, and evenly dissolved.

To the solution was added, with stirring, gaseous formaldehyde at a rate of 15 g./hr. through a conduit heated at 120° C., the gaseous formaldehyde being generated by thermal decomposition of paraformaldehyde having a purity of 99.1% at a temperature of 140° to 150° C. in an autoclave according to Japanese patent application No. 27,380/65. The gaseous state formaldehyde contained 99.2% of formaldehyde, 0.7% of water, 0.05% of methanol, and very small amounts of formic acid and methyl formate.

After about 1 minute of an induction period from the introduction of the formaldehyde, the polymerization system started to become whitishly turbid, and formaldehyde polymers started to deposit. The reaction was continued for 2 hours while keeping the temperature of the polymerization system at 30° C., and then the supply of formaldehyde was stopped. The resulting white precipitates were separated by filtration and dried under reduced pressure at 40° C. for 15 hours, whereby 29.1 g. of white granular polyoxymethylene was obtained. The reduced viscosity thereof was 4.21.

Acetylation of the thus obtained polymer was conducted at 150° C. for one hour in the presence of 0.05 g. of sodium acetate using 40 g. of acetic anhydride having a purity of 99.7%, and the product was separated by filtration and divided into two portions. One portion was sufficiently washed three times with acetone and five times with water, and then dried in vaccum at 40° C. for 15 hours (Sample A).

The other portion was simply washed twice only with water and dried in vacuum likewise (Sample B).

The amount of the residual tin in the polymer and thermal decomposition rate constant, $K_{222}$ (at 220° C., percent per minute) of these Samples A and B were measured, and the result is shown below. Tough films could be prepared from these samples by means of a hot press.

| | Residual tin (p.p.m.) | $K_{222}$ (percent/min.) | Properties of hot press film | |
|---|---|---|---|---|
| | | | Toughness | Color |
| Sample A | 0.4 | 0.03 | More than 100 flexions | White. |
| Sample B | 0.5 | 0.03 | do | Do. |

NOTE: The toughness of hot press was measured according to the method disclosed in Japanese patent publication No. 9,794/57.

A quite similar experiment was conducted by using dibutyltin laurate as a catalyst. The amount of the residual tin in the polymer was 35 p.p.m. after only two simple water washings, and the thermal decomposition rate constant, $K_{222}$, thereof was 0.13 percent/min.

EXAMPLE 2

Polymerization was conducted in the same manner as in Example 1, using 0.050 g. of tetramethyl-1,3-diphenoxydistannoxane as a catalyst. After two hours from the start of the polymerization, the polymerization was stopped, whereby 28.3 g. of white, granular polyoxymethylene was obtained. The reduced viscosity thereof was 3.41. The thus obtained polymer was acylated in the same manner as in Example 1, and the polymer obtained by two simple water washings had a reduced viscosity of 3.38 and a thermal decomposition rate constant at 222° C., $K_{222}$ of 0.04 percent/min. A film having a good toughness and whiteness was obtained by means of a hot press.

EXAMPLE 3

Polymerization was conducted in the same manner as in Example 1, using 0.053 g. of bis-(dimethyllauryloxy-tin) sulfide as a catalyst. After three hours from the start of the polymerization, supply of formaldehyde was stopped, and 40 g. of acetic anyhdride having a purity of 99.3% and 0.1 g. of anhydrous sodium acetate were immediately added to the thus obtained polymer slurry, and the slurry was heated at 156° C. for 30 minutes in the closed flask to effect the terminal acylation. The thus obtained polymer was separated by filtration, washed three times with distilled water in an amount about 10 times as much for each washing, and dried in the same manner as in Example 1, whereby 40.3 g. of acylated polymer was obtained. The reduced viscosity thereof was 2.07, and the thermal stability, $K_{222}$, was 0.03 percent/min. a film having a good toughness and whiteness could be obtained by means of a hot press.

EXAMPLE 4

Polymerization was conducted in the same manner as in Example 1, using 0.060 g. of tetramethyl-1,3-dipropionyloxydistannoxane as a catalyst. The polymerization was continued for 4 hours, and 50 g. of acetic anhydride having a purity of 99.2% and 0.1 g. sodium acetate were added to the thus obtained polymer slurry, and the slurry was heated at 154° C. for 45 minutes with stirring in the closed flask to effect the terminal acylation, whereby 53.7 g. of white granular acylated polymer was obtained. The reduced viscosity thereby was 2.37, and $K_{222}$ thereof was 0.02 percent/min. Na content and Sn content of the polymer were 0.7 p.p.m. and 1.2 p.p.m. respectively.

To the thus acylated polymer were added 1.3% of copolymer of hexamethylenediamine, adipic acid and sebacic acid, 0.2% of 4,4'-butyridene-bis-(3-methyl-6-t-butylphenol) and 0.01% of diphenylamine, and a composition was prepared by mixing and pelletizing. $K_{222}$ thereof was 0.01 percent/min. and the toughness was more than 100 flexions (measured according to the method disclosed in Japanese patent publication No. 9,794/57).

The mechanical properties of the sheet prepared by injection molding of the thus prepared composition are given below:

Tensile yield strength (ASTM D–638): 697 kg./cm.$^2$
Tensile yield elongation (ASTM D–638): 14.0%
Tensile modulus of elasticity: $1.65 \times 10^4$ kg./cm.$^2$
Melt index: 4.80
Vicat softening point (ASTM D–1525): 171° C.

EXAMPLE 5

Polymerization was carried out in the same manner as in Example 1, using 0.034 g. of tetraethyl-1,3-dimethoxydistannoxane as a polymerization catalyst and formaldehyde gas having a purity of 99.5%. The polymerization was continued for two hours, whereby 28.8 g. of white polymer having a reduced viscosity of 2.38 was obtained.

To the thus obtained polymer were added 15 g. of acetic anhydride having a purity of 99.8% and 0.15 g. of sodium acetate, and the resulting evenly wetted polymer was placed into a horizontal, glass, reaction tube having an inner diameter of about 10 cm. and a length of 20 cm., and an external heating system. A stream of acetic anhydride vapor vaporized in another evaporator was continuously introduced at a rate of 2 g./min. into the tube, while rotating the reaction tube to sufficiently stir the polymer in the tube and keeping the polymer temperature at 150° C. In this manner, the reaction was continued for 60 minutes, and the polymers after the reaction had about 5% of acetic anhydride attached, and thus were washed five times with water in an amount 10 times as much for each washing. $K_{222}$ of the thus obtained polymer was 0.04 percent/min.

The thus acylated polymer was mixed with 0.2% of 2,2-methylene-bis-(3-methyl-6-t-butylphenol), 1.0% of 10:1 copolymer of ε-caprolactam and φ-caprolactone, and 0.01% of diphenylamine on the basis of the polymer, and the mixture was formed into pellets for molding. The thus obtained pellets had $K_{222}$ of 0.02 percent/min. and had almost similar mechanical properties to those of Example 4.

EXAMPLES 6–27

Polymerization was conducted at a temperature of 40° C. in the same manner as in Example 1, using 0.01% by mole of tetravalent organo-tin compounds as shown below on the basis of formaldehyde, and the reduced viscosity of the thus obtained polyoxymethylene and $K_{222}$ (percent per min.) of the terminal-acylated polymer obtained by acylating the thus obtained polyoxymethylene and subsequent water wasing in the same manner as in Example 1 are shown below:

| Example No. | Polymerization catalyst | Reduced viscosity | $K_{222}$ (percent/min.) |
|---|---|---|---|
| 6 | Tetra-n-butyl-1,3-diacetoxydistannoxane. | 3.91 | 0.04 |
| 7 | Tetramethyl-1,3-dipropionyloxydistannoxane. | 4.07 | 0.03 |
| 8 | Tetramethoxy-1,3-di-n-butyryloxydistannoxane. | 3.85 | 0.03 |
| 9 | Tetraoctyl-1,3-dilauroyloxydistannoxane. | 3.24 | 0.04 |
| 10 | Tetra-n-butyl-1,3-distearyloxydistannoxane. | 2.85 | 0.05 |
| 11 | Tetraphenyl-1,3-dibenzoyloxydistannoxane. | 3.11 | 0.06 |
| 12 | Tetramethyl-1-acetoxy-3-propionyloxydistannoxane. | 3.91 | 0.03 |
| 13 | 1,1-dimethyl-3,3-di-n-butyl-1,3-diacetoxydistannoxane. | 4.26 | 0.04 |
| 14 | Tetra-(2-cyanoethyl)-1,3-dipropionyloxydistannoxane. | 3.92 | 0.04 |
| 15 | Tetra-(2-methoxyethyl)-1,3-diacetoxydistannoxane. | 2.58 | 0.03 |
| 16 | Tetra-n-butyl-1,3-dimethoxydistannoxane. | 3.25 | 0.06 |
| 17 | Tetra-n-butyl-1-hydroxy-3-phenoxydistannoxane. | 2.47 | 0.06 |
| 18 | Bis-(di-n-propylacetoxy-tin) sulfide. | 2.04 | 0.03 |
| 19 | Tetra(2-hydroxyethyl)-1,3-di-n-butyloxydistannoxane. | 3.04 | 0.05 |
| 20 | Tetracyclohexyl-1,3-didodecyloxydistannoxane. | 2.26 | 0.04 |
| 21 | Tetramethyl-1,3-dichlorodistannoxane. | 3.21 | 0.02 |
| 22 | Tetraoctyl-bromo-3-acetoxydistannoxane. | 2.51 | 0.05 |
| 23 | Tetraethyl-1,3-dithiocyanodistannoxane. | 2.07 | 0.02 |
| 24 | Tetrabutyl-1-hydroxy-3-thiocyanodistannoxane. | 3.22 | 0.06 |
| 25 | Tetra-(pentadecyl)-1,3-ditolyloxydistannoxane. | 2.42 | 0.07 |
| 26 | Tetramethyl-1,3-diethylmercaptodistannoxane. | 2.36 | 0.04 |
| 27 | Tetra-iso-propyl-1,3-diphenylmercaptodistannoxane. | 3.18 | 0.05 |

EXAMPLE 28

Polymerization was conducted at a polymerization temperature of 20° C. in the same manner as in Example 1, using 0.005% by mole of tetramethyl-1,3-diacetoxydistannoxane per formaldehyde as the polymerization catalyst and starting material formaldehyde having varied purities as shown below. Further, polymerization was also conducted under the same conditions as above using the conventional catalyst tributylamine. The reduced viscosities of the polymers obtained at the respective monomer purities are given below:

| | Tetramethyl-1,3-diacetoxydistannoxane | Tributylamine |
|---|---|---|
| Water content of starting formaldehyde (percent by weight): | | |
| 0.01 | 5.05 | 3.41 |
| 0.45 | 4.23 | 1.56 |
| 1.03 | 2.95 | 0.63 |
| 3.25 | 1.78 | 0.04 |

EXAMPLE 29

Polymerization was conducted in the same manner as in Example 1, using 0.007% by mole of tetramethyl-1,3-dipropionyloxy distannoxane and tetramethyl-1,3-dilauryloxydistannoxane per formaldehyde respectively. The bulk densities and shapes of the thus obtained polymers are given below.

Further, polymerization was conducted under the same conditions as above using the well known catalysts tributylamine and calcium stearate as control catalysts, and and the bulk densities and shapes of the thus obtained polymers are also given below:

| Polymerization catalyst | Bulk density of the polymer (g./cc.) | Shapes of the polymer |
|---|---|---|
| Tetramethyl-1,3-diacetoxydistannoxane | 0.62 | Granular. |
| Tetramethyl-1,3-dilauryloxydistannoxane | 0.58 | Do. |
| Tributylamine | 0.10 | Flocky. |
| Calcium stearate | 0.13 | Powdery. |

EXAMPLE 30

Polymerization was conducted in the same manner as in Example 1, using tetramethyl-1,3-diacetoxydistannoxane and tetramethyl-1,3-dilauryloxydistannoxane respectively at a concentration of 0.01% by mole of each per formaldehyde as the catalyst at such varied temperatures of 30°, 40°, 50°, 60°, 70° and 80° C. in n-heptane. The reduced viscosities of the thus obtained polyoxymethylenes are given below:

| | Catalyst | |
|---|---|---|
| | Tetramethyl-1,3-diacetoxydistannoxane | Tetramethyl-1,3-dilauryloxydistannoxane |
| Temperature, (°C.): | | |
| 30 | 3.89 | 3.41 |
| 40 | 3.75 | 3.03 |
| 50 | 3.41 | 2.98 |
| 60 | 3.01 | 2.73 |
| 70 | 2.56 | 2.01 |
| 80 | 1.88 | 1.37 |

EXAMPLE 31

Polymerization was conducted in the same manner as in Example 1, using varied amounts of tetra-n-butyl-1,3-dibutyryloxydistannoxane as the catalyst in n-heptane at a polymerization temperature of 40° C. Further, polymerization as conducted under the same conditions as above using the same catalyst at a polymerization temperature of 70° C. The amounts of the catalyst used and the reduced viscosities of the thus obtained polyoxymethylenes measured in an 1:1 solution mixture of 1-chlorophenol and tetrachloroethane at 60° C. are given below.

| Polymerization temperature | Amount of catalyst (percent by mole/formaldehyde) | Reduced viscosity |
|---|---|---|
| 40° C | 0.004 | 5.32 |
| | 0.021 | 3.24 |
| | 0.103 | 1.80 |
| | 0.517 | 1.12 |
| 70° C | 0.004 | 3.39 |
| | 0.021 | 2.15 |
| | 0.113 | 1.27 |
| | 0.515 | 0.84 |

These relations were plotted in a graph, and linear correlations were obtained, as shown in the accompanying drawing in which graphs 1 and 2 designate the plotting of the values corresponding to polymerization temperature of 40° C. and 70° C. respectively. That is, the following correlation is valid between the reduced viscosity and the amount of the catalyst:

$$\log [\varphi_{sp}/c] = \alpha \log [C] + \beta$$

wherein $[\varphi_{sp}/c]$: reduced viscosity, $C = 0.5\%$ by weight
$[C]$: amount of catalyst, percent by mole/formaldehyde
$\alpha, \beta$: constants depending upon the kind of the catalyst and the polymerization conditions In the present example, $\alpha = -0.32$ and $\beta = 0.043$ at 40° C.
$\alpha = -0.29$ and $\beta = -0.160$ at 70° C.

EXAMPLES 32–40

Two liters of a solution mixture of n-heptane and toluene at a mixing ratio of 1:1 by volume was added to a 3-l, four-necked, separable flask provided with a stirrer and a thermometer, and cooled to −40° C. Then, formaldehyde gas obtained by thermal decomposition of paraformaldehyde having a purity of 98.5% was added to the flask to prepare an absorption liquor having a formaldehyde content of 11.5% by weight. Then, 200 cc. each of the thus obtained absorption liquor was placed in 9 flasks having a capacity of 300 cc.

Each of nine catalysts as shown below was dissolved in toluene, and the thus prepared catalyst solution was added at once to the formaldehyde absorption liquor kept at −40° C. so that the amount of catalyst in the liquor might be 0.05% by mole per formaldehyde, and the flask was stirred vigorously. Rapid polymerization took place after about 30 to 60 seconds from the addition of the catalyst, though there was some difference catalyst to catalyst, and the polymerization was completed within about 2 minutes, whereby white slurries were obtained. The thus obtained slurries were separated by filtration and dried under a reduced pressure at 40° C. for 15 hours, whereby white, granular polyoxymethylene was obtained. The reduced viscosities of the thus obtained polymer are shown below:

| Example No. | Polymerization catalyst | Reduced viscosity |
|---|---|---|
| 32 | Tetramethyl-1,3-dipropionyloxydistannoxane | 3.26 |
| 33 | Tetra-n-butyl-1,3-dilauryloxydistannoxane | 3.07 |
| 34 | Tetramethyl-1,3-dibenzoyloxydistannoxane | 2.55 |
| 35 | 1,1-dimethyl-3,3-di-n-butyl-1-acetoxy-3-butyryloxydistannoxane | 2.83 |
| 36 | 1,1,3-trimethyl-3-n-butyl-1,3-dipropionyldistannoxane | 3.11 |
| 37 | Tetra-(4-cyanobutyl)-1,3-diacetoxydistannoxane | 2.77 |
| 38 | Tetra-n-butyl-1,3-dimethoxydistannoxane | 3.29 |
| 39 | Tetramethyl-1,3-diphenoxydistannoxane | 2.93 |
| 40 | Bis-(dimethylmethoxy-tin) sulfide | 2.32 |

EXAMPLE 41

Polymerization was conducted in the same manner as in Example 1, using 0.085 g. of tetramethyl-1,3-di-tridecyloxydistannoxane as the catalyst and acetic anhydride having a purity of 99.8% as the solvent. Gaseous formaldehyde obtained by thermal decomposition of paraformaldehyde was once passed through a cold trap cooled to 0° C., and then the purified formaldehyde having a purity of 99.7% was subjected to the polymerization. Polymerization was continued for 2 hours at 20° C., and then the supply of formaldehyde was stopped. To the resulting polymer slurry was added 0.05 g. of sodium acetate, and the slurry was heated at 145° C. for 1.5 hours with stirring in the closed flask to effect the terminal acetylation treatment. Then, the polymer was separated by filtration, washed three times with water, and dried under a reduced pressure, whereby 26.5 g. of white granular polymer having a reduced viscosity of 2.04 and $K_{222}$ of 0.03 percent/min. was obtained. A tough film could be prepared from the polymer by means of a hot press.

EXAMPLE 42

Polymerization was conducted in the same manner as in Example 1, using 0.025 g. of bis-(dioctylbutoxy-tin) sulfide as the catalyst, a solution mixture of 99.8% acetic anhydride and methylene diacetate at a mixing ratio of 9:1 by weight as the solvent and gaseous formaldehyde having the same purity as in Example 41 at 20° C. for 2 hours. To the resulting polymer slurry was added 0.05 g. of sodium acetate, and the slurry was heated to 140° to 145° C. under atmospheric pressure to effect the acetylation. The polymer was separated by filtration, washed five times with water and dried under a reduced pressure, whereby 28.4 g. of polymer having a reduced viscosity of 3.24 and $K_{222}$ of 0.05 percent/min. was obtained.

EXAMPLE 43

A solution prepared by dissolving acrylamide into acetonitrile was added to toluene, and 200 ml. of the 2% acrylamide solution was cooled to —40° C. Formaldehyde obtained by thermal decomposition of paraformaldehyde having a purity of 99.2% was passed through a heating tube and absorbed into the acrylamide solution to prepare a 14% formaldehyde solution.

To the thus prepared solution was added 0.01% by mole of tetraethyl-1,3-dibutoxydistannoxane per formaldehyde, dissolved in toluene, and the polymerization was conducted with stirring. To the resulting slurry were added 30 g. of acetic anhydride having a purity of 99.5% and 0.01 g. of potassium acetate and the slurry was heated with stirring at 150° C. for 2 hours. The thus acetylated polymer was separated by filtration, washed three times with water and dried under a reduced pressure, whereby 26.0 g. of white polymer having a reduced viscosity of 2.23 was obtained. It was confirmed by elemental analysis that the polymer contained 1.84% of nitrogen by weight.

EXAMPLE 44

To a 500-ml., four-necked flask provided with a stirrer, thermometer and titrating funnel were added 300 ml. of n-hexane and 0.03 g. of tetramethyl-1,3-diphenoxydistannoxane, and the latter was dissolved homegeneously. Then, gaseous formaldehyde having a purity of 99.8% was introduced into the flask at a rate of 15 g./hour. At the same time when the gaseous formaldehyde was introduced into the flask, 5 g. of chloral dissolved in 60 ml. of toluene was continuously added dropwise to the flask at a rate of 0.5 ml./minute. Supply of formaldehyde was continued for two hours, while keeping the polymerization temperature at 30° C. The resulting polymer slurry was acetylated in the same manner as in Example 43, whereby 29.3 g. of polymer having a reduced viscosity of 1.98 and $K_{222}$ of 0.07 percent/min. was obtained. It was confirmed by elemental analysis that the polymer contained 2.42% of nitrogen by weight.

We claim:

1. A process for producing a thermoplastic moldable polyoxymethylene resin, which comprises polymerizing formaldehyde at a temperature of —80 to 130° C. in an inert solvent in the presence of a catalyst in a molar amount of 0.0001 to 2% based on the formaldehyde, said catalyst being a tetravalent organo-tin compound having the formula,

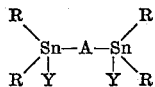

where the R's are the same or different members selected from the group consisting of alkyl groups of 1 to 20 carbon atoms, cyclohexyl, phenyl, benzyl and allyl; and said members substituted with halogen, alkyl groups having 1 to 2 carbon atoms, nitrile, hydroxy, alkoxy groups having 1 to 4 carbon atoms and methoxycarbonyl; A is oxygen or sulfur; and the Y's are the same or different members selected from the group consisting of hydroxy; thiocyano, halogen, —COOR', —OR' and —SR', wherein R' is the same as R, and effecting etherification or esterification of the terminal hydroxy group of the resulting polyoxymethylene.

2. A process according to claim 1, wherein formaldehyde containing a maximum of 6% by weight of water is used in the polymerization.

3. A process according to claim 1, wherein the molecular weight of the formed polyoxymethylene resin conforms to the following equation:

$$\log (M.W.) = \alpha \log (C) + \beta$$

wherein M.W. represents the molecular weight of the formed polyoxymethylene resin; (C) represents the mole number of the catalyst per mole of formaldehyde, and $\alpha$ and $\beta$ are constants specific to the kind of catalyst and the polymerization conditions.

4. A process for producing a thermoplastic, polyoxymethylene copolymer resin, which comprises copolymerizing formaldehyde with a comonomer selected from the group consisting of unsaturated carboxylic acid amides, aliphatic aldehydes other than formaldehyde, and ketenes at a temperature of —80 to 130° C. in an inert solvent in the presence of a catalyst in a molar amount of 0.0001 to 2% based on the formaldehyde, said catalyst being a tetravalent organo-tin compound having the formula,

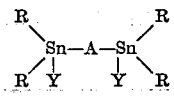

wherein the R's are the same or different members selected from the group consisting of alkyl groups of 1 to 20 carbon atoms, cyclohexyl, phenyl, benzyl and allyl; and said members substituted with halogen, alkyl groups having 1 to 2 carbon atoms, nitrile, hydroxy, alkoxy groups having 1 to 4 carbon atoms and methoxycarbonyl; A is oxygen or sulfur and the Y's are the same or different members selected from the group consisting of hydroxy, thiocyano, halogen, —COOR', —OR' and —SR', wherein R' is the same as R, and effecting etherification or esterification of the terminal hydroxy group of the resulting polyoxy methylene copolymer.

5. A process according to claim 1 and, wherein the stabilized polyoxymethylene resin is purified and recovered by water washing.

6. A process according to claim 1, wherein the esterification is effected by acetylation of the terminal hydroxy groups by reaction of the polyoxymethylene with acetic anhydride at a temperature of 130–180° C., the acetic anhydride being present in an amount of 20–200% by weight of the polymer.

7. A process according to claim 4, wherein the esterification is effected by acetylation of the terminal hydroxy groups by reaction of the polyoxymethylene copolymer with acetic anhydride at a temperature of 130–180° C., the acetic anhydride being present in an amount of 20–200% by weight of the polymer.

8. A process according to claim 1, wherein tetramethyl-1,3-diacetoxydistannoxane is used as the catalyst.

9. A process according to claim 1, wherein tetramethyl-1,3-dipropionyloxy distannoxane is used as the catalyst.

10. A process according to claim 1, wherein tetramethyl-1,3-dilauroyloxy distannoxane is used as the catalyst.

11. A process according to claim 1, wherein polymerization is carried out at a temperature between —40° C. and 80° C.

12. A process according to claim 4, wherein copolymerization is carried out at a temperature between —40° C. and 80° C.

13. A process according to claim 4, wherein the stabilized polyoxymethylene resin is purified and recovered by water washing.

14. A process according to claim 4, wherein tetramethyl-1,3-diacetoxydistannoxane is used as the catalyst.

15. A process according to claim 4, wherein tetramethyl-1,3-dipropionyloxydistannoxane is used as the catalyst.

16. A process according to claim 4, wherein tetramethyl-1,3-dilauroyloxydistannoxane is used as the catalyst.

References Cited

UNITED STATES PATENTS

| 3,311,592 | 3/1967 | Wagner et al. | 260—67 |
| 3,376,328 | 4/1968 | Davies | 260—429.7 |
| 3,470,135 | 9/1969 | Ishida et al. | 260—67 |

WILLIAM H. SHORT, Primary Examiner

L. L. LEE, Assistant Examiner

U.S. Cl. X.R.

260—37 R, 67 FP, 67 UA, 72 R, 429.7